INVENTOR
Kurt A. Leuschner
BY
ATTORNEYS

Patented Sept. 30, 1952

2,612,255

UNITED STATES PATENT OFFICE 2,612,255

CAN TRANSFER MECHANISM

Kurt Alfred Leuschner, Monterey, Calif.

Application January 25, 1950, Serial No. 140,418

5 Claims. (Cl. 198—25)

The present invention pertains to, and it is an object to provide, a novel mechanism for transferring cans, especially food cans, from one conveyor to another traveling in a different direction and without stopping either conveyor.

Another object of the invention is to provide a can transfer mechanism operative to engage and remove cans from a moving conveyor wherein each can is supported in a holder which is open only laterally of the direction of travel but with space between the top of the can and the top of the holder.

A further object of the invention is to provide a can transfer mechanism especially designed, but not limited, for use in a can draining machine as shown in my Patent No. 2,525,141, dated October 10, 1950; this invention representing a modification of the can discharging or transfer mechanism shown and described in said patent.

An additional object of the invention is to provide a can transfer mechanism, for the purpose described, which comprises a novel turntable assembly including a cam actuated, rotary, can pull-out arm unit adapted to work into the can holders from one of their laterally open sides and to engage and pull cans from the holders onto the turntable; the latter delivering the cans—upon release by said unit—onto a carry-off conveyor.

It is also an object of the invention to provide a can transfer mechanism which operates smoothly, effectively, and without can damage; the device being designed for simplicity and economy of manufacture, and when in use requiring a minimum of maintenance or repair.

Still another object of the invention is to provide a practical and effective can transfer mechanism, and one which will be exceedingly effective for the purpose for which it is designed.

These objects are accomplished by means of such structure and relative arrangement of parts as will fully appear by a perusal of the following specification and claims.

Figure 1:
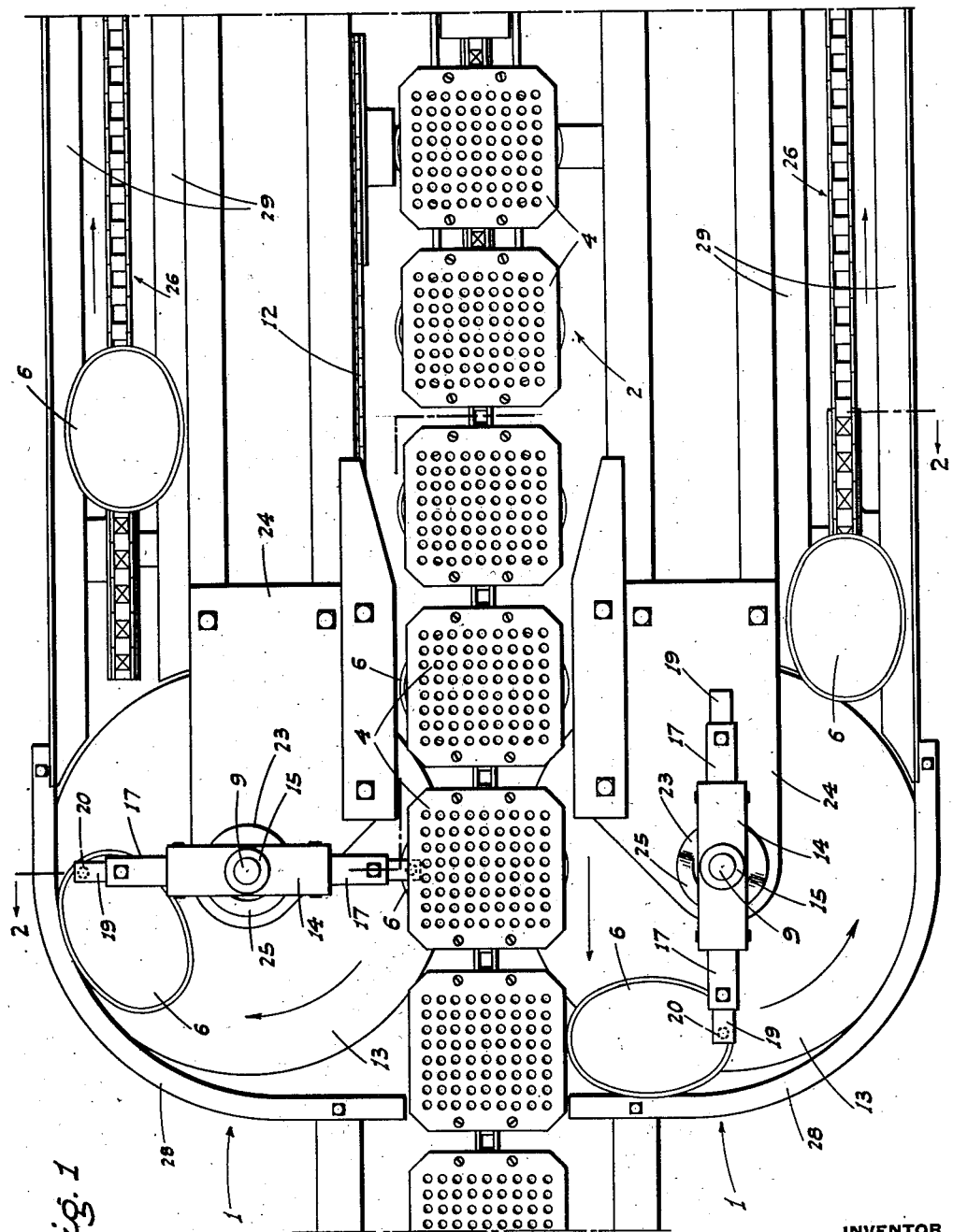
Fig. 1 is a plan view of a pair of the can transferring mechanisms working on opposite sides of an endless conveyor at an intermediate point along the upper run of the latter.
Figure 2:
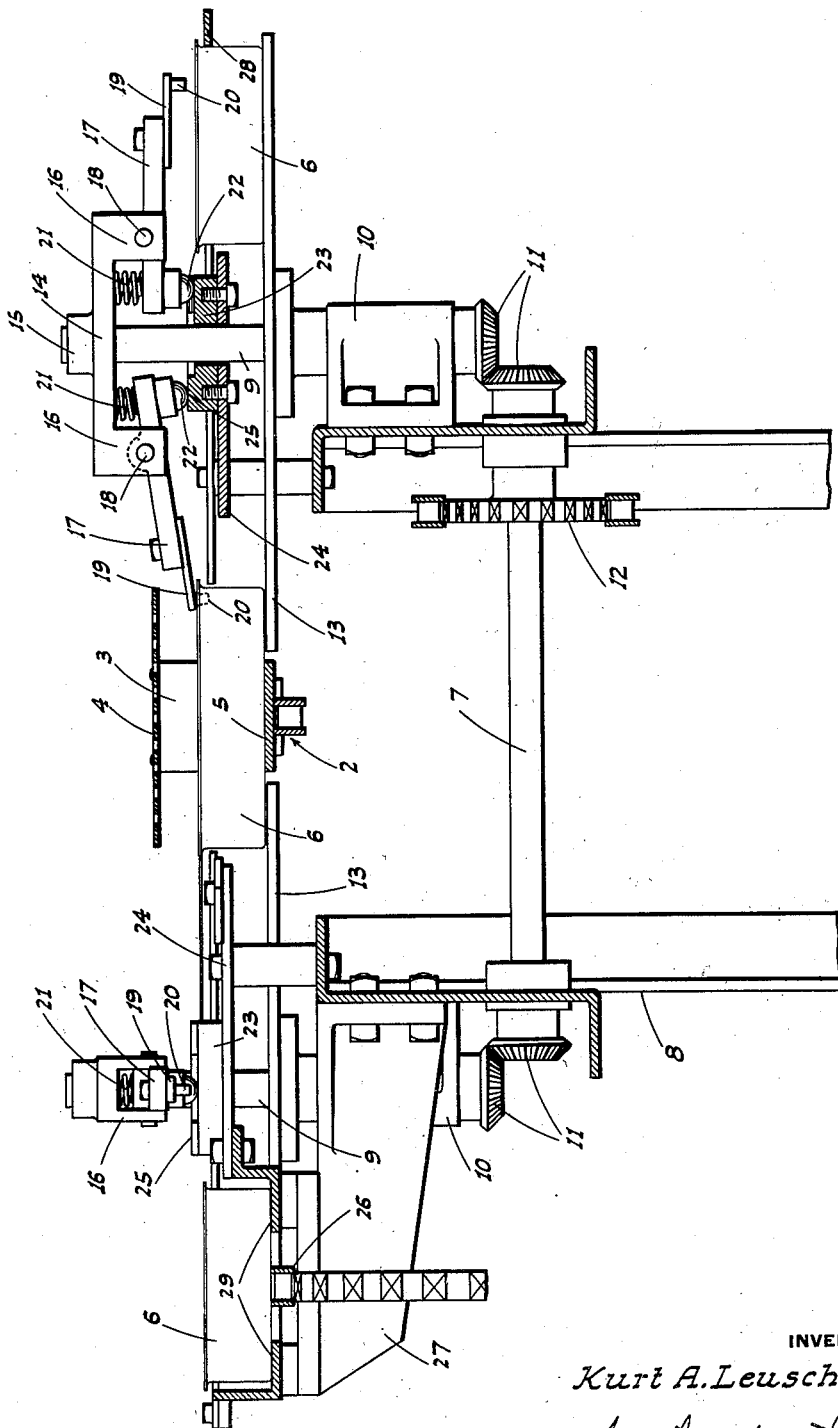
Fig. 2 is a transverse section on line 2—2 of Fig. 1.

Referring now more particularly to the characters of reference on the drawings, a pair of the can transfer mechanisms, each indicated generally at 1, are here shown as mounted on opposite sides of an endless can conveyor 2 in cooperation with the upper run of the latter intermediate its ends.

The can conveyor 2—which represents the main conveyor of a can draining machine as in the aforesaid patent—is fitted, along its length, with a plurality of longitudinally spaced, outwardly projecting can holders 3, each being open only laterally and including an outer drain plate 4 and an inner can supporting plate 5.

The cans, indicated at 6, rest on the can supporting plates 5 as they travel with the upper run of the conveyor 2; there being considerable space between the top of the cans 6 and the drain plate 4. By way of explanation it may be said that when traveling in the lower run of the conveyor 2, the cans 6 are inverted and rest on the drain plates 4 for draining of excess moisture from contents previously packed into said cans.

Except that they act in alternation, the can transfer mechanisms 1 are identical, and therefore a description of one will suffice for both.

A cross shaft 7 is journaled in connection with the main supporting frame 8 of the machine, which includes the endless can conveyor 2, and a spindle 9 upstands laterally out from the upper run of the can conveyor 2, being carried in a journal 10 secured to said main frame 8. The lower end of the spindle 9 is driven from the adjacent end of the cross shaft by meshing bevel gears 11; said cross shaft being driven by suitable means and in timed relation to the conveyor 2 by drive means, indicated in part at 12.

The spindle 9 is fitted with a circular turntable 13 which lies in the same horizontal plane as the can supporting plates 5 as they move along in the upper run of the conveyor 2; such turntable being of a diameter such that it turns quite close to said plates 5 as they pass. With this arrangement the cans 6 can slide from the near supporting plate 5 directly onto the turntable 13 with ease; the cans 6 being pulled out of said holders 3 onto the corresponding turntable 13 by the following cam actuated, rotary, pull-out arm unit:

At its upper end each spindle 9 has an inverted U-shaped yoke 14 secured centrally of its ends thereto by means of an attachment hub 15; the dependent end legs of the yoke 14 being in the form of forks 16.

Radial swing arms 17 extend through the forks 16 on opposite sides of the spindle 9, and each such swing arm is pivoted, as at 18, in the corresponding fork 16 for motion in a vertical plane.

Each swing arm 17 is fitted, at the outer end, with a projecting finger 19 which carries, at its free end, a depending nub 20.

A compression spring 21 seats between the inner end portion of each swing arm 17 and the top of the yoke 14, whereby to urge the finger 19 and the nub 20 to an elevated or non-working position.

The inner end portion of each swing arm 17 is fitted, on the under side, with a ball bearing or other depending anti-friction member 22, and such member bears downwardly and travels on an annular cam 23 which surrounds the spindle 9 above the turntable 13; such annular cam 23 being mounted on a fixed horizontal plate 24 secured rigidly in connection with the main frame 8.

The annular cam 23 is formed, on its top surface, with a part-circle lift 25 of predetermined arcuate extent and position; each radial swing arm 17, together with its finger 19 and depending nub 20, being caused to swing downward at the outer end upon the corresponding ball bearing 22 riding said cam lift 25.

The spindle 9 is rotated at such speed, and each spring arm 17. together with its finger 19, is of such length, that with each revolution of said spindle the finger 19 sweeps through an adjacent one of the can holders 3 from the side thereof and initially above the supported can 6. As each finger 19 sweeps into such an adjacent can holder, the related swing arm 17 is off the cam lift 25 and is in an elevated non-working position. Immediately thereafter the related ball bearing 22 runs onto the cam lift 25, swinging said radial arm 17 and finger 19 downwardly, whereupon the depending nub 20 engages in the open top of said can.

With continued rotation of the spindle 9, the can in which the depending nub 20 is so engaged is swung out of its holder 3 onto the circular turntable 13; the nub 20 remaining engaged in the can for approximately 180°; i. e. to a point on the turntable most remote from the conveyor 2. The related ball bearing 22 then rides off the cam lift 25 and the corresponding swing arm 17, fingers 19, and depending nub 20 are spring-urged upwardly clear of the can; the latter then traveling off the turntable 13 onto an endless carry-off conveyor 26, which is supported in part by a lateral bracket 27, and which runs parallel to the conveyor 2 but in an opposite direction.

The corresponding radial swing arms 17 of the separate can transfer mechanisms 1 are set approximately 90° apart so that said arms work alternately into the can holders 3 to engage and pull cans out thereof onto the turntables 13, whereby only half of the cans from the conveyor 2 travel the respective carry-off conveyors 26.

The cans as they are swept from the holders 3 onto the turntables 13 engage suitable guides 28 which prevent said cans from escaping the turntables 13 in an outward direction; the cans as they engage on and travel with the carry-off conveyors 26 being likewise guided, as at 29.

With the above can transfer mechanism, cans from an endless conveyor can be effectively discharged from the latter to one or both sides thereof, dependent on the number of mechanisms 1 which are employed; the action of engaging and pulling the cans from the holders 3 being smooth, positive, and effective.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. Mechanism adapted to transfer open cans from a conveyor laterally onto an adjacent support, comprising an upstanding driven spindle projecting above the support, and a rotary arm unit radiating from the spindle above the support adapted to successively engage and drag cans onto said support from the conveyor; the arm unit being vertically swingable, an element on the outer end of the arm unit adapted to lower into each can from above to engage the upstanding wall of such can in dragging relation, and means to raise and lower the arm unit in predetermined timed relation to travel of cans on said conveyor.

2. In combination with a pair of adjacent conveyors, one having laterally opening can holders thereon and the other being a can carry-off conveyor, a can transfer mechanism, working between said conveyors, comprising a driven turntable assembly positioned between said conveyors to receive cans from said one conveyor and to deliver said cans to the other conveyor, a spindle upstanding axially from and driven with the turntable assembly, an arm unit radiating from the spindle above the turntable assembly, said arm unit being of a length to sweep into and out of an adjacent can holder from the side with each revolution of said spindle, means pivoting the arm unit in connection with the spindle for vertical swinging, the arm unit being above the related can upon swinging into a holder, and cam means operative to then lower the arm unit into can engagement and maintain said engagement until the arm unit has withdrawn the engaged can from the holder onto the turntable assembly.

3. Mechanism to transfer open cans from a horizontal conveyor laterally onto an adjacent turntable, comprising a driven spindle upstanding from the turntable axially thereof, a double-ended yoke fixed on the spindle above the turntable, opposed arm units radiating from adjacent the spindle under the yoke and of a radial length sufficient to overhang the conveyor at one point in their circular movement, said units being pivoted intermediate their ends on said yoke for vertical swinging motion between predetermined raised and lowered positions, each arm unit including a depending nub adjacent its outer end to enter a can on the conveyor for engagement with the upstanding wall thereof only when the arm unit is in its lowered position, and an annular fixed cam about the spindle between the turntable and arm units and engaged by the adjacent ends of the latter, the cam being shaped to cause the arm units to recurringly lower and raise at predetermined points in the rotary path of travel of the arm units.

4. A can transfer apparatus comprising, in combination, a central endless driven conveyor having a row of closely and equally spaced open-sided individual can retaining holders therealong, driven turntables level with said row of holders on opposite sides of the conveyor, carry-off conveyors on opposite sides of the central conveyors onto which the corresponding turntables deliver, and can engaging members rotatably mounted with and on the turntables disposed and adapted with respect to each other to engage and transfer cans in succession from the holders to the corresponding turntables but in alternating order.

5. Mechanism to transfer open cans from a conveyor laterally onto an adjacent support comprising a horizontal arm unit disposed above the support and conveyor and including a depending nub on one end adapted to enter a can and engage against the upstanding wall thereof, means mounting the arm unit for horizontal movement between a position in which the nub overhangs the conveyor and a can thereon and another position in which the nub overhangs the support, and means acting on the arm unit upon such movement thereof to lower the nub when reaching the first named position and to raise the nub clear of the can when the arm unit reaches said other position.

KURT ALFRED LEUSCHNER.

REFERENCES CITED

The following references are of record in the file of this patent:

UNITED STATES PATENTS

| Number | Name | Date |
|---|---|---|
| 1,096,310 | Martin | May 12, 1914 |
| 1,139,070 | Phelps | May 11, 1915 |
| 1,284,638 | Foss | Nov. 12, 1918 |
| 1,326,903 | Augensen | Jan. 6, 1920 |
| 2,404,232 | Hunter | July 16, 1946 |
| 2,525,141 | Leuschner | Oct. 10, 1950 |